June 18, 1963  D. R. TREFFEISEN  3,094,691
FAILURE DETECTION MEANS FOR DATA TRANSMISSION SYSTEMS
Filed Sept. 1, 1959
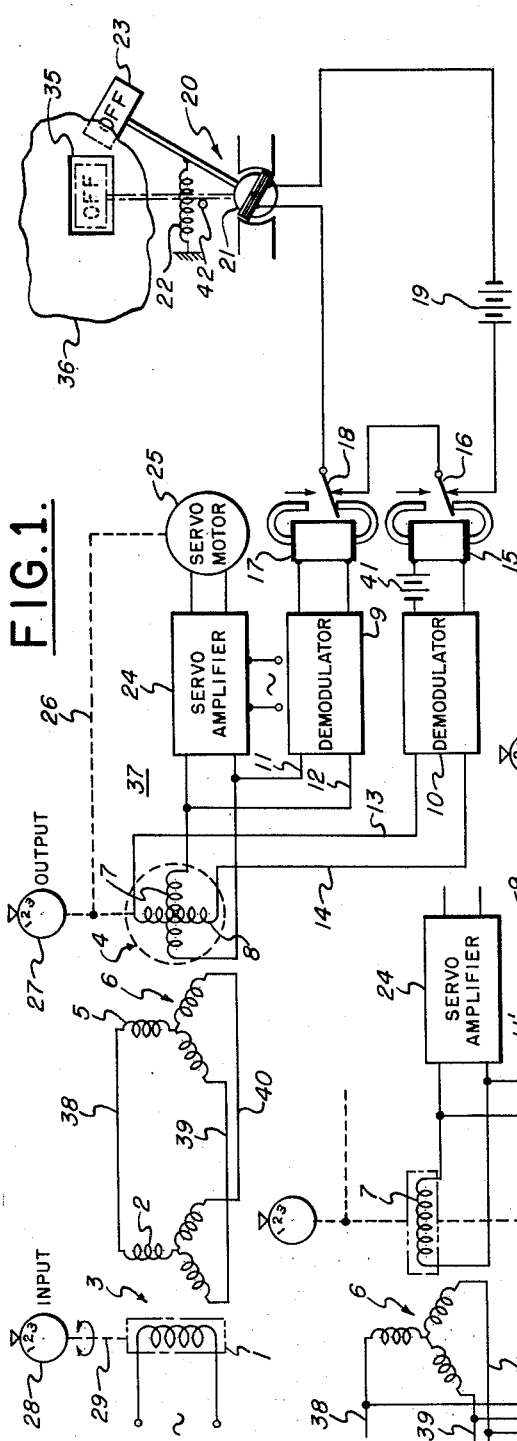
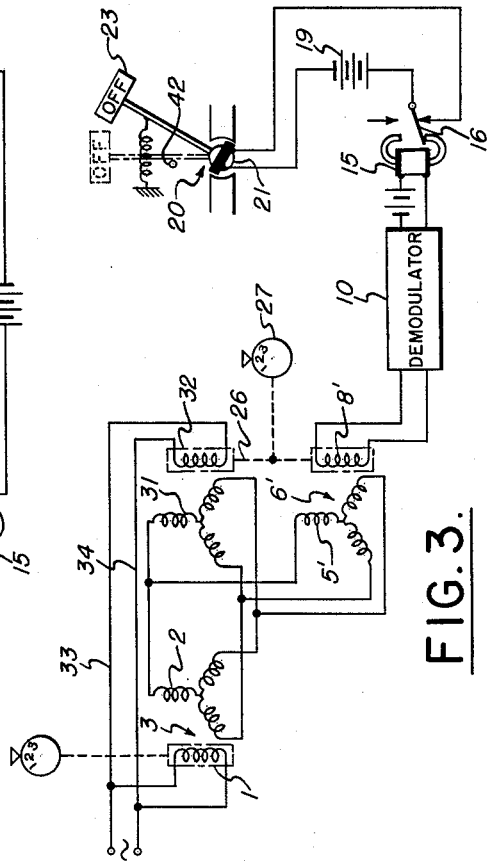
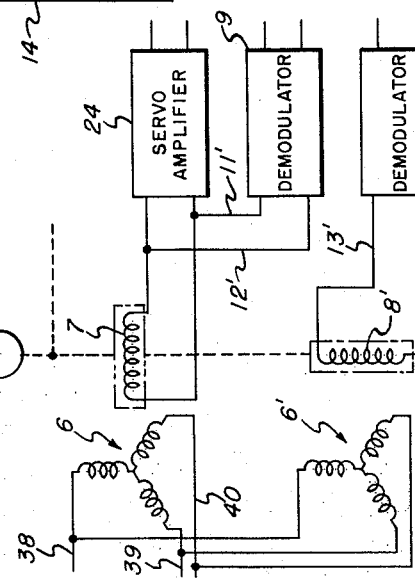
INVENTOR
DONAL R. TREFFEISEN
BY
ATTORNEY United States Patent Office 3,094,691
Patented June 18, 1963

3,094,691
FAILURE DETECTION MEANS FOR DATA
TRANSMISSION SYSTEMS
Donal R. Treffeisen, Huntington Station, N.Y., assignor to Sperry Rand Corporation, Great Neck, N.Y., a corporation of Delaware
Filed Sept. 1, 1959, Ser. No. 837,514
8 Claims. (Cl. 340—268)

The present invention relates to synchro data transmission systems and, more specifically, is concerned with a failure detection or warning circuit for indicating improper synchro system operation.

In systems employing a synchro data transmitter and a synchro data receiver controlled to remotely reproduce the angular relationship of the transmitter rotor and stator elements, null-seeking servo means are commonly employed to position the data receiver rotor. The servo drives the receiver rotor to a position at which a minimum or null voltage is produced in the receiver rotor. The minimum voltage position occurs where the magnetic axis of the rotor coil is perpendicular to the resultant flux vector generated by the receiver stator windings.

It will be recognized that the attainment of a minimum voltage on the receiver rotor winding is not an unambiguous criterion of proper operation of the synchro system. For example, a total loss of system power would produce the same receiver rotor null voltage. Other types of system malfunction also would produce an ambiguous receiver rotor null. Should there be a break in one of the transmission lines interconnecting the transmitter and receiver synchros, for example, the orientation of the receiver flux vector usually would shift. This would cause the receiver rotor to assume an erroneous null position bearing some purely arbitrary relation with respect to the position of the transmitter rotor. Thus, the mere presence of a null potential on the receiver synchro rotor clearly is insufficient as a positive indication of proper operation of the synchro system.

It is the principal object of the present invention to provide an improved failure detection system for use in a synchro data transmission system.

Another object is to provide means for unambiguously detecting not only data receiver malfunctioning but also failures of the data transmitter and the data transmission lines.

A further object is to provide a failure warning system permitting substantially undisturbed and normal operation of the synchro system which is being monitored.

Another object is to provide a simplified and compact failure warning device for monitoring the performance of substantially all the components of a complete synchro data transmisison system.

These and other objects of the present invention, as will appear from a reading of the following specification, are accomplished in a preferred species by the utilization of a synchro data receiver having a pair of rotor windings perpendicularly disposed to each other. One of the windings produces the error signal for actuating the receiver rotor positioning servo in a conventional manner. The second of the two windings is employed, in accordance with the invention, as a source of failure detection signal, the amplitude of which is unambiguously indicative of proper synchro system operation. The amplitude of the signal actually induced in said second of the rotor coils is compared against a predetermined reference voltage corresponding to the maximum voltage which normally would be induced in said second coil. Means are provided for sensing a variation of the actual induced voltage from the predetermined reference voltage and for producing a warning indication upon such variation.

Alternative arrangements are contemplated by the present invention for providing for the location of the failure detection winding and for increasing the detection sensitivity thereof.

For a more complete understanding of the invention, reference should be had to the following specification and to the drawings of which:

FIG. 1 illustrates a synchro data transmission system including a receiver servo system equipped with the failure indicating means of the present invention;

FIG. 2 illustrates an alternative embodiment wherein the failure detection winding is located in a synchro data receiver separate from the primary data receiver of the synchro system; and FIG. 3 illustrates another embodiment adapted for operation with a primary data receiver of a self-synchronous type.

Referring to FIG. 1, synchro data transmitter 3 includes stator windings 2 and rotor winding 1 the latter of which is excited by an alternating voltage. Winding 1 is positioned by input shaft 29 affixed to indicating dial 28. Stator windings 2 are connected to stator windings 5 of synchro data receiver 6 through transmisison lines 38, 39 and 40. Receiver 6 includes a rotor 4 having two perpendicularly disposed windings 7 and 8. Winding 7, which is the control or error voltage source for servo positioning means 37, is connected to servo amplifier 24. Amplifier 24 is of a phase-sensitive type whose output drives servomotor 25. The shaft of motor 25 is mechanically coupled by member 26 to position rotor 4 of data receiver 6 in a conventional manner.

Failure detection winding 8 of rotor 4 lies within the same magnetic field as does control winding 7. Because of the fixed perpendicular relationship between windings 7 and 8, however, it will be seen that when control winding 7 is rotated to its null position by servo 37, failure detection winding 8 will produce a predetermined maximum output voltage. The voltage induced in winding 8 is applied by leads 13 and 14 to demodulator 10. Demodulator 10, in turn, produces an output signal proportional to the amplitude of the alternating signal developed across coil 8. The output signal of demodulator 10 is applied to polarized relay 15 through the series connected voltage source 41.

Contacts 16 of polarized relay 15 are actuated, as shown, whenever the output voltage of demodulator 10 is opposite to and just exceeds the potential source of source 41. The potential of source 41 is adjusted to correspond to a value slightly less than the predetermined maximum voltage normally induced in winding 8 of data receiver 6. The difference between said predetermined maximum potential and that of source 41 is determined by the minimum potential required for the energization of relay 15 and the consequent actuation of its contacts 16.

Contacts 16 are connected in series circuit with potential source 19 for the selective energization of coil 21 of D'Arsonval meter movement 20. Failure warning flag 23 is driven by meter movement 20 and is mechanically biased by spring 22 toward mechanical stop 42. Flag 23 is visible through aperture 35 of mask 36 when in the "Off" position. Neglecting for the moment the presence and function of contacts 18 of relay 17, the off position is assumed whenever contacts 16 of relay 15 are deactuated.

It will be seen that any malfunction of the synchro data transmission system causes a decrease in the voltage output of demodulator 10 from a predetermined maximum value (represented by source 41). This, in turn, deactuates contacts 16 of polarized relay 15. Upon the deactuation of contacts 16, source 19 is disconnected from coil 21 of meter movement 20. The deenergization of coil 21 and the consequent torque failure permit spring 22 to restrain flag 23 to the "Off" position against stop 22. This result would be produced, for example, by a decrease in amplitude of the alternating current source energizing rotor 1 of synchro transmitter 3, by a fault in any of the transmission lines 38, 39 and 40, by a fault in any of the windings of the synchro transmitter or synchro receiver, or by failure of the servo amplifier 24, servomotor 25, or mechanical connecting means 26.

It is preferred, of course, that failure detection winding 8 of data receiver 6 be uniformly sensitive to the amplitude of the flux generated by stator windings 5 independent of the angular position of rotor 4. For example, if servo 37 should fail, allowing rotor 4 to be arbitrarily oriented with respect to the flux vector, the corresponding decrease in the voltage output of coil 8 would normally be a function of the angular displacement of coil 8 relative to the flux. That is, in a given magnetic field, the rate of change of voltage induced in coil 8 normally is considerably less about a zero relative displacement angle between the flux vector and the axis of the coil than it is about a 90° relative displacement angle. Techniques are available in the art for specially fabricating coil 8 so that its output voltage gradient is steep about its peak voltage position. Alternatively, however, the present invention provides means in certain of its species for retaining maximum failure detection sensitivity without resort to such special fabrication techniques.

Returning to FIGURE 1, the potential appearing across control winding 7 of rotor 4 is applied via leads 11 and 12 to demodulator 9. The output of demodulator 9 is connected to relay 17. Contacts 18 of relay 17 are actuated as shown when relay 17 is deenergized. Thus, the appearance of even a relatively small voltage at the output of demodulator 9 would break the circuit energizing coil 21 of meter movement 20. In this manner, the previously described servo failure would be promptly detected because of the maximum sensitivity position of null coil 7 whereas the same failure might go undetected if only the output signal of demodulator 10 where utilized. The maximum sensitivity characteristic of coil 7 is imparted to the failure indicating device by imposing two conditions for the actuation of meter movement 20, namely, that substantially no voltage be produced at the output of demodulator 9 at the same time that the predetermined maximum voltage is produced at the output of demodulator 10. With this arrangement, the requirement for a specially wound failure detection coil 8 is obviated.

It should be noted that the position sensitivity of coil 8 becomes a problem only where a malfunction occurs which prevents coil 7 from being aligned at the null position. Generally, this involves a failure in servo 37. On the other hand, a failure in the data transmission system would not cause any degradation in the sensitivity of failure detection coil 8. So long as coil 7 is oriented at a constant angle relative to the flux vector of synchro 6, the voltage induced in failure detection coil 8 would always linearly follow changes in the amplitude of the alternating flux vector. Thus, it is preferred, although not obligatory, that provision be made for increasing the sensitivity of detection coil 8 either by special winding techniques or by utilizing the output of control winding 7 for failure detection purposes.

It is also optional as to where control winding 8 is located; it is not necessary that it be part of rotor 4 of receiver 6. Alternatively, it may be contained in a separate auxiliary data receiver 6' as shown in FIG. 2. In FIG. 2, the stator windings of auxiliary receiver 6' are connected in parallel with the stator windings of primary receiver 6. The single rotor coil 8' of receiver 6' is mechanically coupled to the control winding 7 of receiver 6 in fixed angular relationship. The fixed relationship is such that a maximum voltage is induced in rotor winding 8' when a minimum voltage is induced in rotor winding 7. As in the case of FIG. 1, the voltage produced across detection winding 8' is applied to demodulator 10 whereas the voltage produced across winding 7 is applied to servo amplifier 24 and preferably also to demodulator 9.

The present invention further contemplates that the primary data receiver be of the self-synchronous type as shown in FIG. 3 rather than of the servo positioned types as shown in FIGS. 1 and 2. Data receiver 31 of FIG. 3 includes rotor winding 32 which is excited in parallel with rotor 1 of data transmitter 3. Thus, rotor coil 32 is self-positioned in conventional self-synchronous manner to correspond with the position of rotor 1 of data transmitter 3. As is the case with FIG. 2, the stator coils 5' of auxiliary data receiver 6' are connected in shunt with the stator coils of primary data receiver 31. Rotor 8' is mechanically coupled to rotor 32 in fixed relationship so that maximum voltage is induced in coil 8' when rotor winding 32 of data receiver 31 has been aligned with rotor winding 1 of data transmitter 3. As before, the voltage induced across the failure detection coil 8' is coupled to demodulator 10. FIG. 3 further illustrates the case where solely the output signal of demodulator 10 is utilized for the actuation of the failure warning circuit. Maximum failure detection sensitivity depends entirely upon the output voltage gradient of coil 8' about its peak voltage position. The lack of a null-seeking coil in FIG. 3 precludes employment of the detection sensitivity enhancement technique commonly applicable to FIGS. 1 and 2.

From the preceding it can be seen that the objects of the present invention have been achieved in a synchro data transmission system by the provision of an auxiliary failure detection coil mechanically coupled in a fixed angular relationship with the rotor coil of the primary data receiver synchro. The predetermined relationship is such that maximum voltage is induced in the auxiliary coil only when synchronization has been achieved between the data transmitter and data receiver rotor coils. A failure condition is indicated whenever the auxiliary coil voltage decreases from a predetermined maximum voltage.

While the invention has been described in its preferred embodiments, it is understood that the words which have been used are words of description rather than of limitation and that changes within the purview of the appended claims may be made without departing from the true scope and spirit of the invention in its broader aspects.

What is claimed is:

1. In a synchro data transmission system wherein the angular position of the primary synchro receiver coil is remotely synchronized with the angular position of a synchro transmitter member, means for detecting failures in said system, said means comprising an auxiliary synchro receiver coil coupled to said primary receiver coil in a fixed angular relationship, means for immersing said primary and said auxiliary coils in substantially the same alternating magnetic field whereby a predetermined maximum voltage is induced in said auxiliary coil by said alternating magnetic field only when synchronization has been achieved between said primary receiver coil and said transmitter member, a source of reference voltage having an amplitude substantially equal to that of said predetermined voltage, and means including said source for sensing decreases in the amplitude of the voltage induced in said auxiliary coil from the amplitude of said reference voltage.

2. In a synchro data transmission system wherein the angular position of a primary synchro receiver coil is remotely synchronized with the angular position of a synchro transmitter member, means for detecting malfunctions in said system, said means comprising an auxiliary synchro receiver coil coupled to said primary receiver coil in a fixed angular relationship, means for exciting said auxiliary coil with an alternating magnetic field substantially the same as that which excites said primary receiver coil whereby a predetermined maximum voltage is induced in said auxiliary coil when synchronization has been achieved between said primary receiver coil and said transmitter member, a source of reference voltage having an amplitude substantially equal to that of said predetermined voltage, and means including said source for sensing decreases in the amplitude of the voltage induced in said auxiliary coil from the amplitude of said reference voltage.

3. In a synchro data transmission system wherein the angular position of a primary synchro receiver coil is remotely synchronized with the angular position of a synchro transmitter member, means for detecting malfunctions in said system, said means comprising an auxiliary synchro receiver coil coupled to said primary receiver coil for rotation therewith in a fixed angular relationship, means for exciting said auxiliary coil by an alternating magnetic field substantially the same as that which excites said primary receiver coil whereby a maximum voltage is induced in said auxiliary coil by said alternating magnetic field only when synchronization has been achieved between said primary receiver coil and said transmitter member, a source of reference voltage having an amplitude substantially equal to that of said maximum voltage, and means including said source for producing a warning indication when the amplitude of the voltage induced in said auxiliary coil is less than said amplitude of said reference voltage.

4. In a synchro data transmission system wherein the angular position of a primary synchro receiver coil is remotely synchronized with the angular position of a synchro transmitter member, means for detecting malfunctions in said system, said means comprising an auxiliary synchro receiver coil coupled to said primary receiver coil in a predetermined angular relationship, means for immersing said primary receiver coil and said auxiliary coil in substantially the same alternating magnetic field whereby a maximum voltage is induced in said auxiliary coil by said alternating magnetic field when a minimum voltage is induced in said primary receiver coil, a source of reference voltage having an amplitude substantially equal to that of said maximum voltage, and means for producing a warning indication when the amplitude of the voltage induced in said auxiliary coil is less than said amplitude of said reference voltage.

5. In a synchro data transmission system wherein the angular position of a primary synchro receiver coil is remotely synchronized with the angular position of a synchro transmitter member, means for detecting malfunctions in said system, said means comprising an auxiliary synchro receiver coil coupled to said primary receiver coil in a predetermined angular relationship, means for immersing said primary receiver coil and said auxiliary coil in substantially the same alternating magnetic field whereby a predetermined maximum voltage is induced in said auxiliary coil by said alternating magnetic field when a minimum voltage is induced in said primary receiver coil and means coupled to said primary and auxiliary coils and responsive to the voltages induced therein for producing a system performance indication upon the simultaneous concurrence of said minimum and predetermined maximum voltages.

6. In a synchro data transmission system including a primary synchro receiver having stator and rotor coils and wherein said primary receiver rotor coil is remotely synchonized with the angular position of a synchro transmitter member, means for detecting malfunctions in said system, said means comprising an auxiliary synchro receiver having stator and rotor coils, the stator coils of said primary and auxiliary synchro receivers being connected together in parallel, means for drivably coupling said primary receiver rotor coil and said auxiliary rotor coil in a fixed angular relationship whereby a predetermined voltage is induced in said auxiliary rotor coil when synchronization has been achieved between said primary receiver rotor coil and said transmitter member, a source of reference voltage having an amplitude substantially equal to that of said predetermined voltage, and means including said source for sensing decreases in the amplitude of the voltage induced in said auxiliary rotor coil from the amplitude of said reference voltage.

7. In a synchro data transmission system including a primary synchro receiver having stator and rotor coils wherein said primary receiver rotor coil is remotely synchonized with the angular position of a synchro transmitter member, means for detecting falfunctions in said system, said means comprising an auxiliary synchro receiver having stator and rotor coils, the stator coils of said primary and auxiliary synchro receiver being connected together in parallel, means for coupling said primary receiver rotor coil and said auxiliary rotor coil in a fixed angular relationship whereby a predetermined maximum voltage is induced in said auxiliary coil when a minimum voltage is induced in said primary receiver coil, and means coupled to said primary and auxiliary coils and responsive to the voltages induced therein for producing a system performance indication upon the simultaneous concurrence of said minimum and predetermined maximum voltages.

8. Means for detecting malfunctions in a synchro data transmission system, said system including a data transmitter having a positionable member and a primary synchro receiver having first and second perpendicularly disposed coils, said means for detecting comprising means for synchronizing the angular position of said first coil with the angular position of said positionable member of said data transmitter, said means for synchronizing including means for exciting said first and second coils by the same alternating magnetic field whereby predetermined minimum and maximum voltages are simultaneously induced in said first and second coils, respectively, when said synchronization is achieved, first and second switching means respectively connected to said first and second coils, said first switching means being actuated by said minimum voltage of said first coil and said second switching means being actuated by said maximum voltage of said second coil, and means coupled to said first and second switching means for producing a system performance indication upon the simultaneous actuation of said first and second switching means.

References Cited in the file of this patent

UNITED STATES PATENTS

| | | |
|---|---|---|
| 2,428,402 | Winterbottom | Oct. 7, 1947 |
| 2,762,959 | Welch | Sept. 11, 1956 |
| 2,810,119 | Brown | Oct. 15, 1957 |